(12) United States Patent
Dilts et al.

(10) Patent No.: US 9,308,868 B2
(45) Date of Patent: Apr. 12, 2016

(54) ACCESS STEP FOR AGRICULTURAL MACHINE

(71) Applicant: CNH America LLC, New Holland, PA (US)

(72) Inventors: Mark D. Dilts, New Holland, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 21 days.

(21) Appl. No.: 13/874,784

(22) Filed: May 1, 2013

(65) Prior Publication Data

US 2014/0327223 A1 Nov. 6, 2014

(51) Int. Cl.
*B60R 3/02* (2006.01)
*B60R 3/00* (2006.01)
*A01D 41/12* (2006.01)

(52) U.S. Cl.
CPC ............ *B60R 3/007* (2013.01); *A01D 41/1261* (2013.01)

(58) Field of Classification Search
CPC ............ B60R 3/02; B60R 3/007; B60R 9/06; B63B 27/146; E06C 1/381; E06C 7/082; E02F 9/0833; A01D 41/1261
USPC .................. 280/163, 164.1, 164.2, 166, 169; 296/62
See application file for complete search history.

(56) References Cited

U.S. PATENT DOCUMENTS

| | | | |
|---|---|---|---|
| 3,244,433 A * | 4/1966 | Grigsby ..................... | 280/163 |
| 6,945,189 B1 * | 9/2005 | Garelick et al. ............. | 114/362 |
| 7,661,693 B1 | 2/2010 | Lipski | |
| 8,366,129 B2 | 2/2013 | Salmon et al. | |
| 2005/0275187 A1 * | 12/2005 | Chaudoin et al. ............ | 280/166 |
| 2009/0145692 A1 | 6/2009 | Flickinger et al. | |
| 2011/0011675 A1 * | 1/2011 | Ebbenga et al. ............. | 182/106 |

* cited by examiner

*Primary Examiner* — Bryan Evans
(74) *Attorney, Agent, or Firm* — Patrick M. Sheldrake

(57) ABSTRACT

An agricultural machine includes: a base member; and a step assembly coupled with the base member. The step assembly includes: a support member coupled with the base member and configured for moving relative to the base member between a support member storage position and a support member operating position; and at least one step coupled with the support member and configured for moving relative to the support member between a step storage position and a step operating position, the step assembly being in a step assembly storage position when the support member is in the support member storage position and the at least one step is in the step storage position, the step assembly being in a step assembly operating position when the support member is in the support member operating position and the at least one step is in the step operating position.

9 Claims, 10 Drawing Sheets

ACCESS STEP FOR AGRICULTURAL MACHINE

BACKGROUND OF THE INVENTION

1. Field of the Invention

The present invention relates to agricultural machines such as agricultural harvesters, and, more particularly, to access steps used with such combines.

2. Description of the Related Art

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Agricultural equipment, including combines, must work in all conditions and climates. As such, the equipment is frequently tall for ground clearance. The equipment also has many moving parts which have service needs. Operators and service people may have difficulty accessing these service points because the tall ground clearance makes it hard to get to the service points.

What is needed in the art is a way to improve access to components which need to be serviced or adjusted without sacrificing ground clearance or function.

SUMMARY OF THE INVENTION

The present invention provides a step assembly which can be used to access service or adjustment points without sacrificing ground clearance or function.

The invention in one form is directed to an agricultural machine, including: a base member; and a step assembly coupled with the base member. The step assembly includes: a support member coupled with the base member and configured for moving relative to the base member between a support member storage position and a support member operating position; and at least one step coupled with the support member and configured for moving relative to the support member between a step storage position and a step operating position, the step assembly being in a step assembly storage position when the support member is in the support member storage position and the at least one step is in the step storage position, the step assembly being in a step assembly operating position when the support member is in the support member operating position and the at least one step is in the step operating position.

The invention in another form is directed to a step assembly for being coupled with a base member of an agricultural machine, the step assembly including: a support member configured for being coupled with the base member and for moving relative to the base member between a support member storage position and a support member operating position; and a at least one step coupled with the support member and configured for moving relative to the support member between a step storage position and a step operating position, the step assembly being in a step assembly storage position when the support member is in the support member storage position and the at least one step is in the step storage position, the step assembly being in a step assembly operating position when the support member is in the support member operating position and the at least one step is in the step operating position.

The invention in yet another form is directed to a step assembly for an agricultural machine, the step assembly including: a pivot plate; and a plurality of steps including a first step and a second step, the first step being connected to the pivot plate and configured for pivoting relative to the pivot plate about a first axis between a first step storage position and a first step operating position, the second step being connected to the pivot plate and configured for pivoting relative to the pivot plate about a second axis between a second step storage position and a second step operating position, the second axis being perpendicular to the first axis, the plurality of steps being in a step storage position when the first step is in the first step storage position and the second step is in the second step storage position, the plurality of steps being in a step operating position when the first step is in the first step operating position and the second step is in the second step operating position.

An advantage of the present invention is that it provides a step or a series of steps which make it easier to access service or adjustment points on agricultural equipment.

Another advantage is that the step or series of steps can advantageously be mounted to the rear of a combine for accessing the cleaning shoe and integral chopper or integral beater. For example, the step may be made such that it is welded or bolted to the same location as the rear hitch assembly. It may be attached with or without the hitch, depending on whether the customer chooses the option. The hitch mounting point is a strong attachment point because the hitch mounting point must withstand the forces of towing a trailer; as such, the hitch mounting point is an advantageous place to mount a step.

Yet another advantage is that, as chaff and residue are exhausted from the rear of the combine, the step assembly can be designed to store in a location to minimize the accumulation of debris. A movable component of the step is designed to minimize the area upon which debris can accumulate.

Yet another advantage is that the step assembly includes at least one movable component for the transition from a storage position to an operating position and from an operating position to a storage position, the operating position being intended to be used by an operator to access service or adjustment points. The storage position is advantageously chosen so that the step assembly takes up the minimum amount of space and clears functional components of the combine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used in this specification principally for convenience, but it is to be understood that these terms are not intended to be limiting. Thus "grain" refers to that part of the crop material which is threshed and separated from the discardable part of the crop material, which is referred to as non-grain crop material, MOG, or straw. Incompletely threshed crop material is referred to as "tailings". Also, the terms "forward", "rearward", "left" and "right", when used in connection with movable agricultural equipment such as an agricultural harvester and/or components thereof are usually determined with reference to the direction of forward operative travel of the harvester; but, again, they should not be construed as limiting. The terms "longitudinal" and "transverse" are determined with reference to the fore-and-aft direction of the agricultural harvester and are equally not to be construed as limiting.

Figure 1:
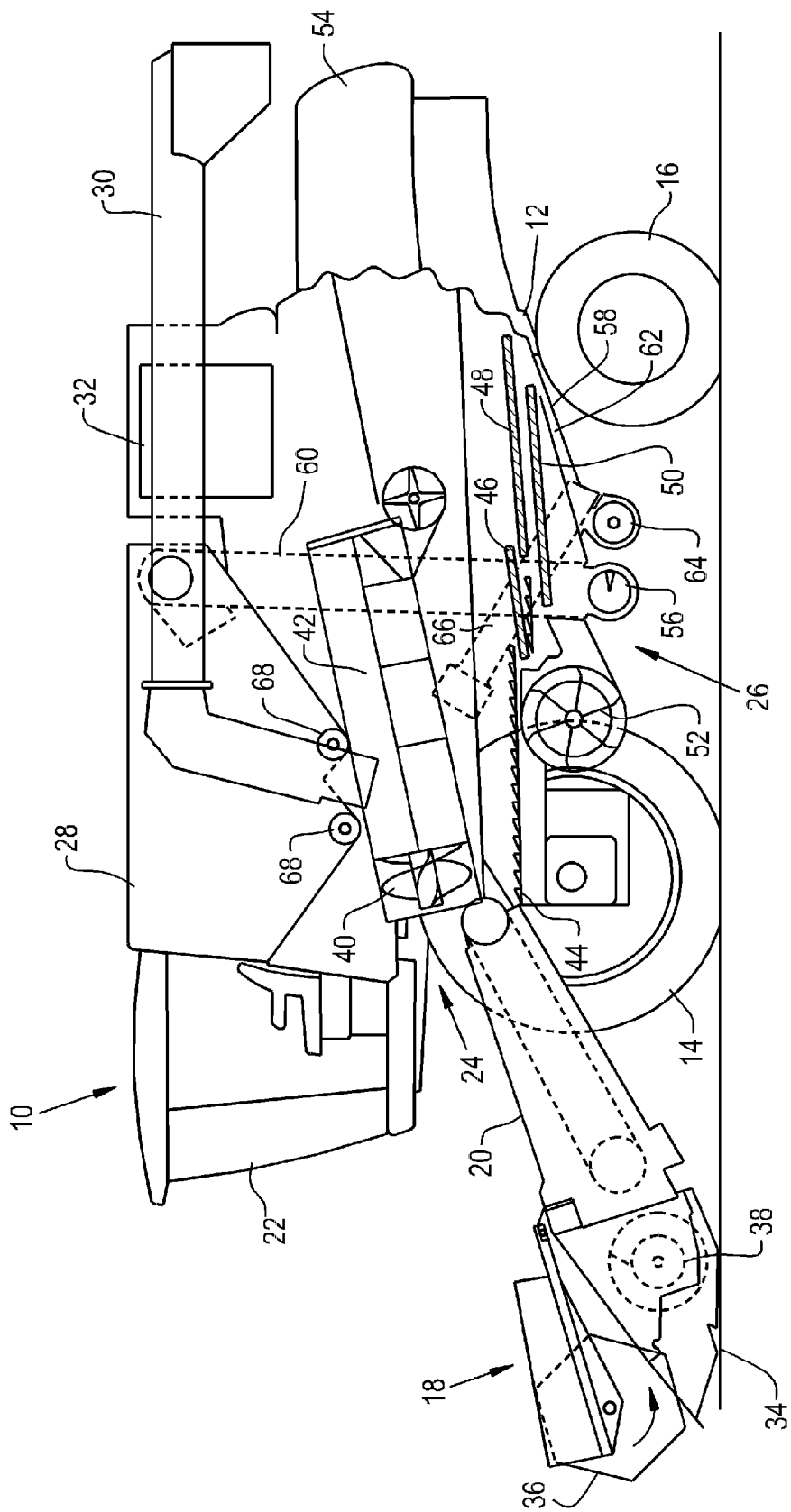
FIG. 1 is a side view schematically showing an agricultural machine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24 and is selectively vertically movable using appropriate actuators, such as hydraulic cylinders (not shown).

Threshing and separating system 24 is of the axial-flow type and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 of cleaning system 26. Clean grain auger 56 conveys the clean grain laterally to a generally vertically arranged grain elevator 60 for transport to grain tank 28. Tailings from cleaning system 26 fall to a tailings auger trough 62 via bottom pan 58. The tailings are transported via tailings auger 64 and return auger 66 to the upstream end of cleaning system 26 for repeated cleaning action. A pair of grain tank augers 68 at the bottom of grain tank 28 conveys the clean grain laterally within grain tank 28 to unloading auger 30 for discharge from combine 10.

According to an aspect of the present invention, and referring now to FIGS. 2-5, there is shown an agricultural machine 100 in the form of an agricultural harvester, which can be referred to as a combine, with portions broken away. More particularly, the rear axle 102 is shown from the rear, the chassis which attaches to the rear axle not being shown. While the drawings show agricultural harvester 100, it is understood that the present application can be applied to other forms of agricultural machines or equipment, including, but not limited to, trailers.

Agricultural machine 100 includes a base member 104 and a step assembly 106. Step assembly 106 is coupled with base member 104. Step assembly 106 includes a support member 108 and at least one step 110, 112. Support member 108 is coupled with base member 104 via pivot member 132 and is configured for moving relative to said base member 104 between a support member storage position 114 and a support member operating position 116. The at least one step 110, 112 is coupled with support member 108 and is configured for moving relative to support member 108 between a step storage position 118 (FIG. 2) and a step operating position 120 (FIG. 3). Step assembly 106 is in a step assembly storage position 122 when support member 108 is in support member storage position 114 and the at least one step 110, 112 is in step storage position 118. Step assembly 106 is in a step assembly operating position 124 when support member 108 is in support member operating position 116 and at least one step 110, 112 is in step operating position 120.

Figure 2:
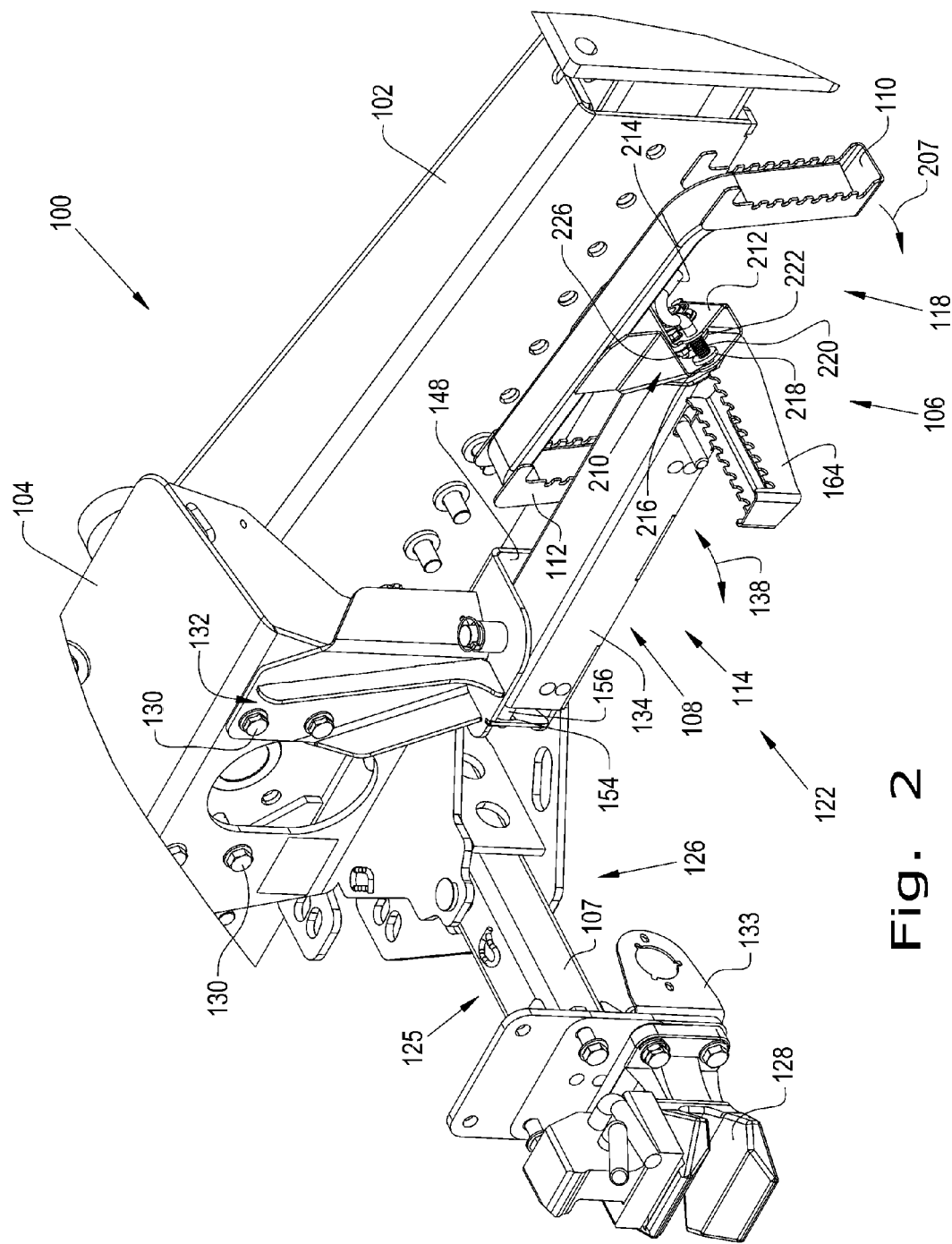
FIG. 2 is a perspective view of an a portion of an agricultural machine with a rear hitch assembly and a step assembly according to the present invention.
Figure 3:
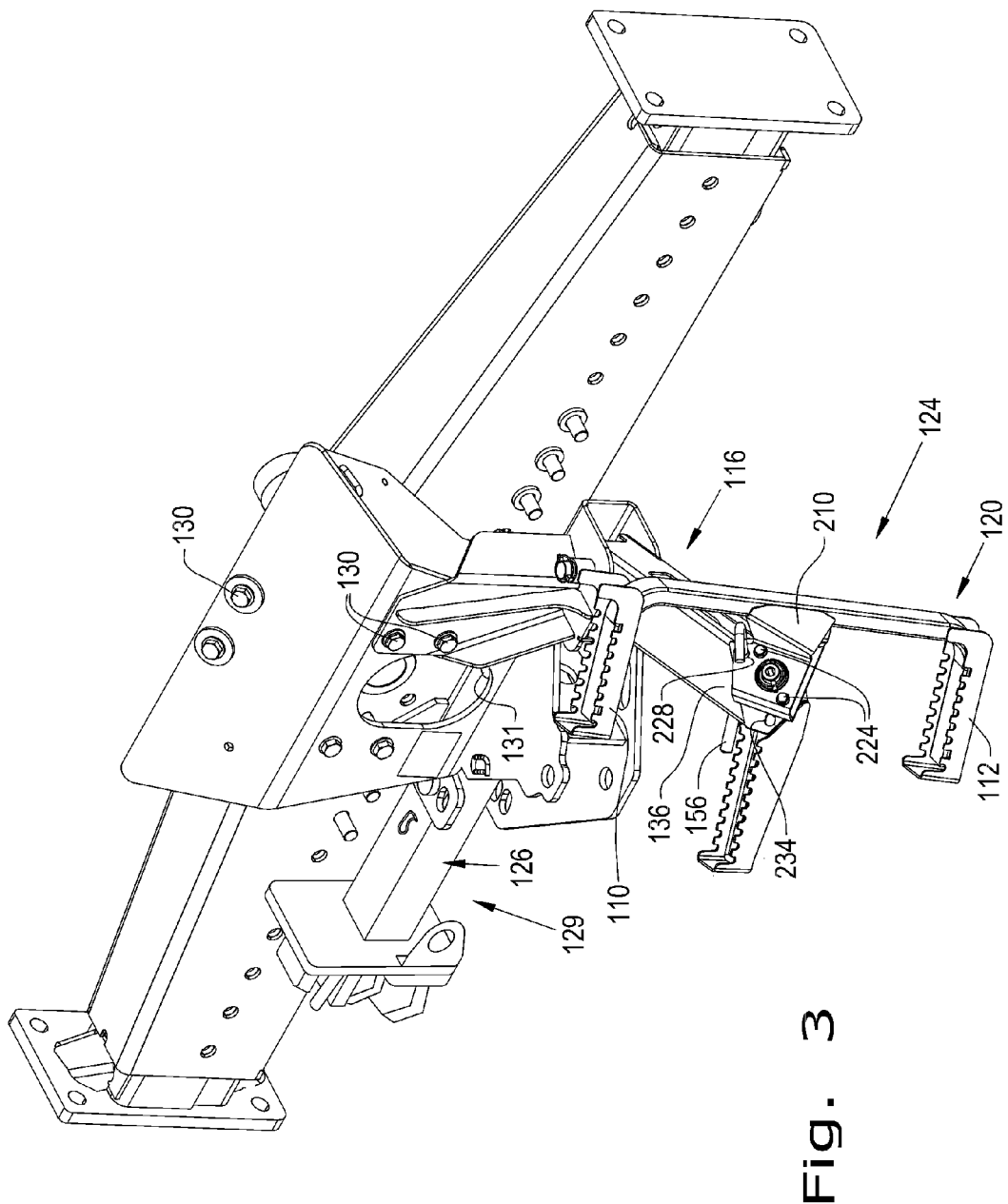
FIG. 3 is a perspective view of the rear hitch assembly and the step assembly of FIG. 2.

FIG. 2 shows a portion of rear axle 102 of combine 100 as well as a rear hitch assembly 126 that the combine 100 can use to tow equipment behind the combine 100. While not shown, wheels are attached to both longitudinal ends of rear axle 102. Rear hitch assembly 126 includes a hitch mount 104 (hitch mount serving as the base member 104 according to this embodiment of the present invention), a hitch support member 107, and a hitch 128. Hitch mount 104 mounts to the chassis of the combine 100, the rear axle 102 also being mounted to the chassis; the chassis is positioned between hitch mount 104 and rear axle 102 but is not shown in the figures. FIGS. 2 and 3 show that hitch mount 104 can be attached to the chassis of combine 100 by way of two bolts 130 at the top of the hitch mount 104 and four additional bolts 130 in the rear face of hitch mount 104, two of these bolts 130 being to one side of an elliptical hole in this rear face and two other bolts 130 being to the other side of this elliptical hole. Thus, base member 104 can be a mounting member (the hitch mount 104) for rear hitch assembly 126. In an alternative embodiment of the present invention, support member 108 can be attached directly to the chassis of combine 100 or directly to the rear axle 102, rather than to hitch mount 104; in this way, the base member of the present invention can be either a chassis or a rear axle 102. FIG. 2 shows rear hitch assembly 126 in an operating position 125. FIG. 3 shows rear hitch assembly 126 in a storage position 129, rear hitch assembly 126 rotating about a pin 131. A mounting bracket 133 is shown which can hold an electrical connector (not shown), mounting bracket 133 mounting to rear of hitch 128 via two existing bolts. FIG. 3 shows rear hitch assembly 126 schematically. Further, the rear hitch assembly 126 may include a tether (not shown) for a linch pin to secure a hitch clevis pin.

Figure 4:
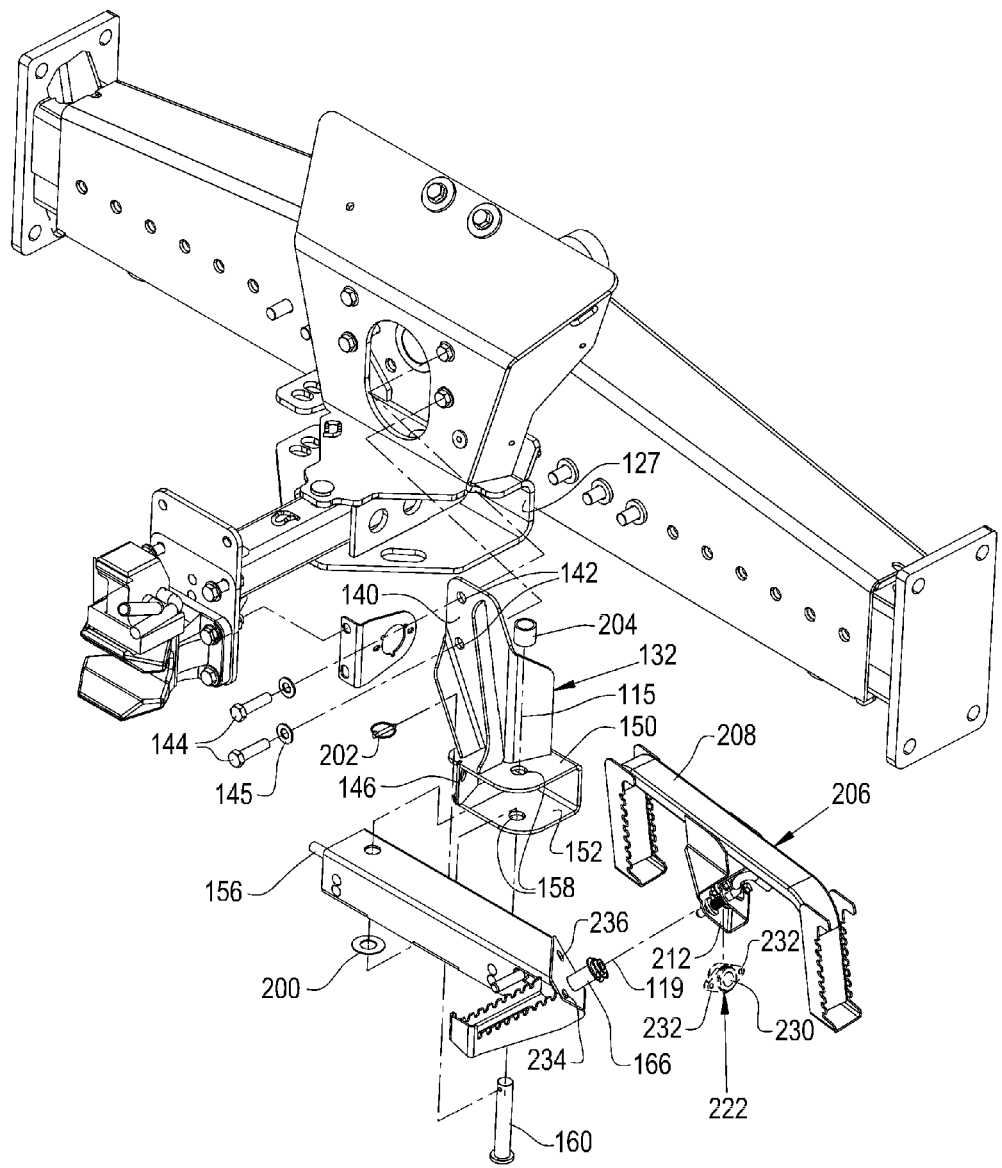
FIG. 4 is an exploded view of the rear hitch assembly and the step assembly of FIG. 2.

FIGS. 2-4 show that support member 108 includes a pivot bracket 132 (which can be referred to as a pivot weldment) and an elongate support arm 134 attached to pivot bracket 132. Elongate support arm 134 includes a distal end 136, the at least one step 110, 112 being coupled with the distal end 136. Support arm 134 is pivotably connected to hitch mount 104, pivoting in the direction of double-arrow 138 between support member storage position 114 and support member operating position 116. FIG. 2 shows support member 108 in support member storage position 114. Support member 108 is in support member storage position 114 when support arm 134 has been pivoted so that support arm 134 is substantially parallel to rear axle 102. FIG. 3 shows support member 108 in support member operating position 116. Support member 108 is in support member operating position 116 when support arm 134 has been pivoted so that support arm 134 forms an angle with rear axle 102 (for example, ninety degrees).

FIGS. 2-4 show that pivot bracket 132 includes a plate 140 with two through-holes 142, bolts 130 extending through these through-holes 142 to bolt pivot bracket 132 to hitch mount 104. In this way, the bolts 130 used to mount hitch mount 104 to chassis can also be used to mount pivot bracket 132 to hitch mount 104. Optionally, other bolts can be used. On the other hand, if rear hitch assembly 126 is not used, then (as indicated above) pivot bracket 132 can be mounted directly to the chassis (or to rear axle 102). To mount pivot bracket 132 directly to chassis bolts 144 can be used, washers 145 being associated with bolts 144. Pivot bracket 132 also includes an enclosure which receives and holds a proximal end of elongate support arm 134. The enclosure includes a side wall 146, a front wall 148, an upper wall 150, and a bottom wall 152. Side wall 146 includes a through-hole 154 which receives a rod 156 when support arm 134 is in the support member storage position 114. Front wall 148 also includes a through-hole (not shown) which receives rod 156 when support arm 134 is in the support member operating position 116. These holes 154 serve to receive and hold the rod 156 securely in position so that the support arm 134 is securely and selectively held in the respective support member storage position 114 or support member operating position 116. The upper and lower walls 150, 152 of the enclosure also include through holes 158 which receive a clevis pin 160 to pivotally connect support arm 134 to pivot bracket 132.

Figure 5:
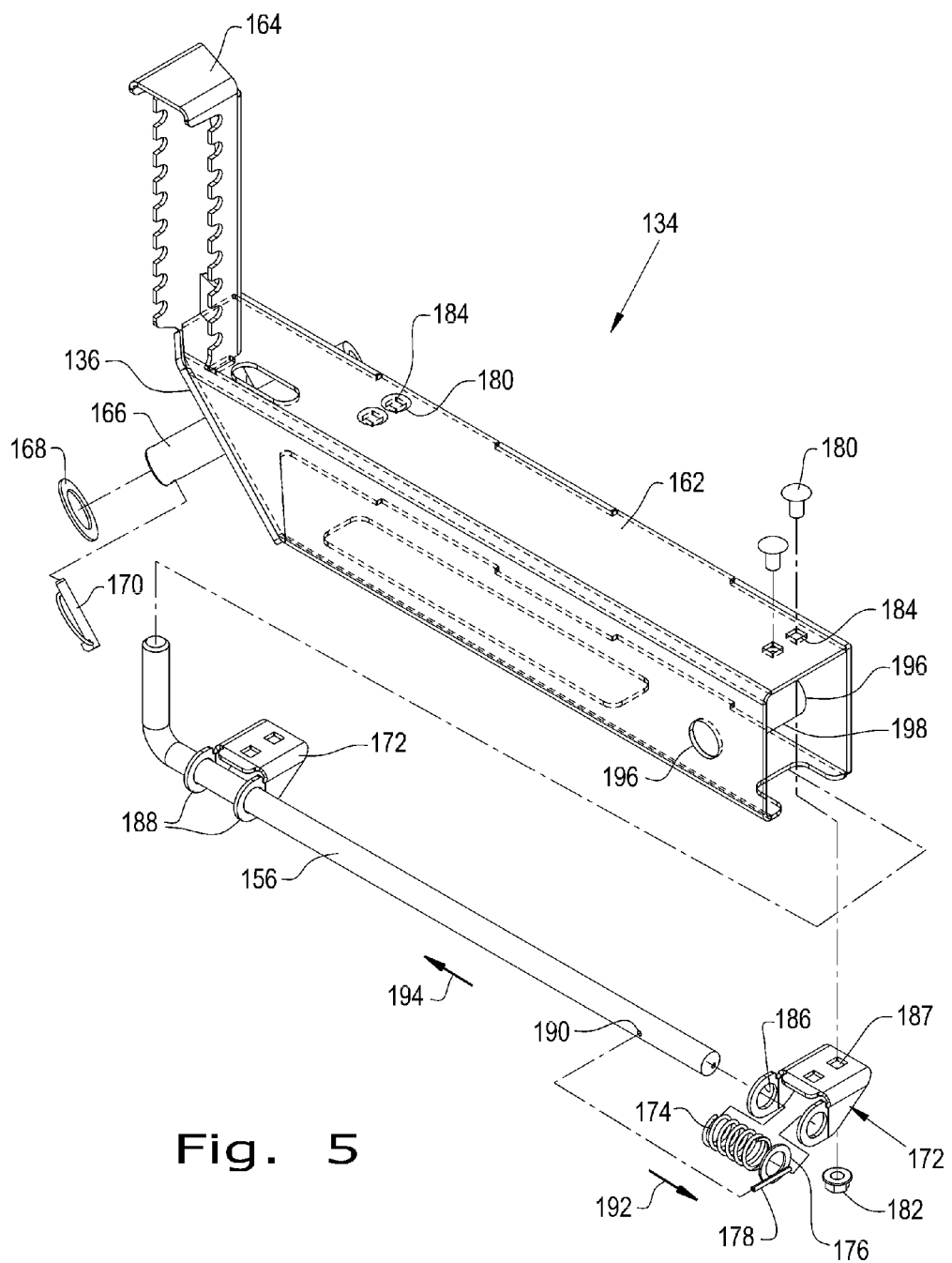
FIG. 5 is an exploded view of a support arm of the step assembly of FIG. 2.

FIG. 5 shows support arm 134. Support arm 134 includes a hollow tube 162, an additional step 164, a pin 166, a washer 168, a linch pin 170, two guides 172, an L-shaped rod 156 (which can be plated), a spring 174, a washer 176, a roll pin 178, bolts 180, and nuts 182. The additional step 164 can be welded to the tube 162 and extend from tube 162 as shown in FIG. 5. Pin 166 can be a tube or pipe and can be welded to tube 162 to be a component of the support arm 134 weldment. A washer 168 is mounted on one end of pin 166, and pin 170 extends through a through-hole in pin 166 to thereby securely hold pivot bracket 210 to support arm 134. Support member 108 (specifically, support arm 134) is configured for pivoting about a first axis 115 between support member storage position 114 and support member operating position 116. Two guides 172 are mounted to a side of tube 162. Bolts 180 and nuts 182 hold these guides 172 onto the side of tube 162 by way of corresponding through-holes 184, 187 in tube 162 and guides 172. Rod 156 extends through holes 186 in guides 172 defined by guide arms 188, as shown in FIG. 5. Spring 174, washer 176, and roll pin 178 are positioned between the guide arms 188 of one guide 172, roll pin 178 being inserted into a corresponding through-hole 190 of rod 156. Spring 174 and roll pin 178 serve to bias rod 156 in the direction of arrow 192 and thereby into a detent position so that rod 156 can extend into either of holes 154 in pivot bracket 132. When rod 156 is pulled in the direction of arrow 194 using the rod's handle, then the rod 156 can be removed from the holes 154 in pivot bracket 132 so that support arm 134 can pivot between support member storage and operating positions 114, 116. Further, the proximal end of tube 162 includes two holes 196 aligned with a hollow cylinder 198 extending between opposing walls. Clevis pin 160 is inserted through these through-holes 196 and cylinder 198, as well as through through-holes 158 of the enclosure of pivot bracket 132, a washer 200 (such as a thrust washer) being on one end of clevis pin 160, a linch pin 202 extending through a through-hole at the other end of the clevis pin 160. A spacer 204 can be positioned over clevis pin 160 between pin 202 and the upper wall 150 of the enclosure of pivot bracket 132.

FIG. 2 shows that the at least one step 110, 112 can include a plurality of the step 110, 112. Stated another way, the step 110, 112 can form a part of a ladder 206 which includes a plurality of steps 110, 112 (for example, two, three, four, or more steps). The at least one step 110, 112 (more specifically, the ladder 206) is coupled with the distal end 136 of support arm 134. FIGS. 2-4 show that ladder 206 includes two steps 110, 112 and an arm 208 connecting the steps together 110, 112. The steps 110, 112 can be welded to arm 208. Ladder 206 further includes a pivot bracket 210 welded to arm 208. Pivot bracket 210 includes two opposing walls 212. Ladder 206 further includes a ladder support pin 214, a pin 216, a washer 218, a compression spring 220, a bearing 222, two bolts 224, and two nuts 226. Ladder support pin 214 includes a hook that a user can use to pull on the ladder support pin 214. Ladder support pin 214 is inserted into two corresponding through-holes 228 in pivot bracket 210, one through-hole 228 being formed in one wall 212 of pivot bracket 210, the other through-hole 228 being formed in the opposing wall 212 such that the portion of ladder support pin 214 inserted through through-holes 228 forms substantially a ninety-degree angle with walls 212. Spring 220, pin 216, and washer 218 are positioned between walls 212. Relatively speaking, spring 220 is positioned adjacent the wall 212 nearest the hook portion of ladder support pin 214, pin 216 is positioned adjacent the other wall 212, and washer 218 is positioned between spring 220 and pin 216. Pin 216 extends through a through-hole in the straight portion of ladder support pin 214 between walls 212. When ladder support pin 214 is pulled by a user, then pin 216 moves toward spring 220. Otherwise, spring 220 biases pin 216 against wall 212. Bearing 222 has a central through-hole 230 and two wings 232, each wing 232 having a through-hole. FIGS. 2-4 show the heads of the two bolts 224, bolts 224 being positioned through corresponding through-holes in one of the walls 212 of pivot bracket 210 and also through the through-holes on the wings 232 of bearing 222 (FIG. 4 shows bearing 222 in solid lines installed relative to bracket 210 and also in broken lines exploded from bracket 210). The bolts 224 and nuts 226 thus hold the bearing 222 between walls 212 and attached to one of the walls 212. The central hole 230 of bearing 222 receives pin 166. Thus, pin 166 is inserted through corresponding through-holes in walls 212 and through central hole 230 of bearing 222, pin 170 through pin 166 and washer 168 then being positioned to the outside of pivot bracket 210 such that pivot bracket 210 is held to support arm 134.

Ladder 206 can rotate relative to support arm 134 between step storage position 118 and step operating position 120. Ladder 206 can rotate from step storage position 118 to step operating position 120 by rotating in the direction of arrow 207 and returned to step storage position 118 by rotating ladder 206 in the direction opposing arrow 207. In this way, FIG. 4 shows that steps 110, 112 are configured for pivoting about a second axis 119 between step storage position 118 and step operating position 120, first axis 115 and second axis 119 being at an acute angle relative to one another in FIG. 4. FIG. 2 shows ladder 206 in step storage position 118, and FIG. 3 shows ladder 206 in step operating position 120. Ladder 206 is in step storage position 118 when ladder support pin 214 is inserted in hole 234, and ladder 206 is in step operating position 120 when ladder support pin 206 is inserted in hole 236. To move ladder 206 from step storage position 120 to step operating position 120, ladder 206 can be rotated clockwise when viewing ladder generally from the right side of the page of FIG. 2. In this way, the step 110 located to the right in FIG. 2 becomes the top step in FIG. 3. Thus, FIGS. 2-4 show that the plurality of steps 110, 112 can move between the step storage position 118 and the step operating position 120 when the plurality of steps 110, 112 are rotated relative to the support member 108.

In use, support member 108 is moved relative to base member 104 from support member storage position 114 to support member operating position 116. Then, ladder 206 is rotated relative to support member 108 from step storage position 118 to step operating position 120. FIG. 3 shows support member operating position 116 to be at an acute angle relative to rear axle 102, but it is understood that the user will pivot support arm 134 further such that support arm 134 is substantially perpendicular to rear axle 102 and rod 156 fits within a hole (not shown) in the front wall 148 of pivot bracket 132, this hole serving as a detent. Thus, rear hitch assembly 126 must be rotated into storage position 129 to use step assembly 106, according to the present embodiment (optionally, intermediate positions for seating either rear hitch assembly 126 or support member 108 could be designed). Ladder 206 can be rotated back to step storage position 118, and support member 108 can be rotated back to support member storage position 116.

In this way, the present invention provides a method for using an agricultural machine, including the steps of: providing base member 104 (as described above) and step assembly 106 (as described above); moving support member 108 relative to base member 104 between support member storage position 114 and support member operating position 116; moving at least one step 110, 112 relative to support member 108 between step storage position 118 and step operating position 120, step assembly 106 being in step assembly storage position 122 when support member 108 is in support member storage position 114 and at least one step 110, 112 is in step storage position 118, step assembly 106 being in step assembly operating position 124 when support member 108 is in support member operating position 116 and at least one step 110, 112 is in step operating position 120. Steps 110, 112 move between step storage position 118 and step operating position 120 when steps are rotated relative to support member 108. Support member 108 (specifically, support arm 134) pivots about first axis 115 between support member storage position 114 and support member operating position 116. Steps 110, 112 pivot about second axis 119 between step storage position 118 and step operating position 120, first axis 115 and second axis 119 being at an acute angle relative to one another.

Figure 6:
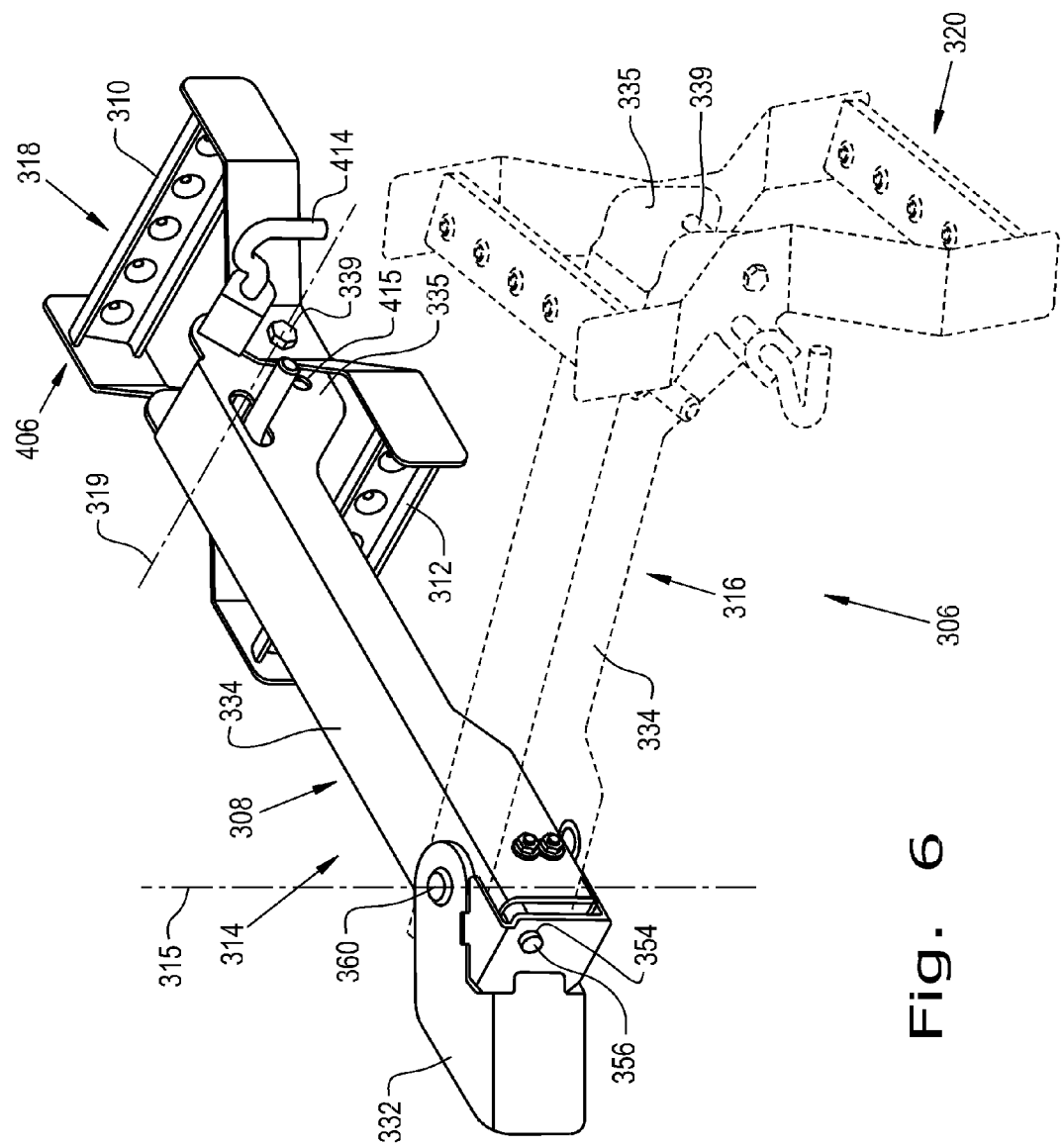
FIG. 6 is a perspective view of another embodiment of the step assembly according to the present invention.

FIG. 6 shows another embodiment of the step assembly of the present invention. The step assembly 306 of FIG. 6 generally corresponds to step assembly 106, the corresponding parts being raised by 200. Step assembly 306 includes a support member 308 and a ladder 406. The support member 308 includes a pivot bracket 332, support arm 334, and a ladder 406. Pivot bracket 332 is different than the pivot bracket 132. Pivot bracket 332 is positioned in a U-shaped section 127 of hitch mount 104 and is welded thereto either against the back of the U-shaped section or against another wall in the same vicinity. Pivot bracket 332 can include an outer bracket (the side facing into hitch mount 104 can have an absence of a wall) and an inner bracket (shown in FIG. 6 as including detent hole 354), the outer and inner brackets being shown in FIG. 6. The outer bracket can be welded to hitch mount 104. Clevis pin 360 serves as a pivot pin; a portion of a hair pin cotter is shown which secures pin 360. When pivot bracket 332 is positioned in U-shaped section 127, pivot 360 extends outside of U-shaped section 127. Support arm 334, which includes rod 356 as described above, pivots relative to pivot bracket 332 between a support member storage position 314 (shown in solid lines in FIG. 6) and a support member operating position 316 (shown in broken lines in FIG. 6). Support arm 334 can be a hollow body having no bottom wall but for a portion of rod near hitch mount 104. Rod 356 is inserted in through-hole 354 which serves as a detent relative to support member storage position 314. Another hole (not shown) in the inner bracket of pivot bracket 332 can serve as a detent for rod 356 when support arm 334 is in support member operating position 316. Support arm 334 includes a forked distal end including opposing walls 335. The opposing walls 335 include one set of through-holes which receive a bolt 339 about which the ladder 406 pivots relative to support arm 334. One of the opposing walls 335 includes two additional through-holes 415 which selectively receive an end of ladder support pin 414, one of the holes 415 corresponding to the step storage position 318 (shown in solid lines in FIG. 6) and the other hole 415 corresponding to the step operating position 320 (shown in broken lines in FIG. 6). Holes 415 serve as detents and thereby to hold the end of ladder support pin 414 therein. Support member 308 (specifically, support arm 334) is configured for pivoting about a first axis 315 between support member storage position 314 and support member operating position 316. Steps 310, 312 are configured for pivoting about a second axis 319 between step storage position 318 and step operating position 320, first axis 315 and second axis 319 being perpendicular relative to one another.

Figure 7:
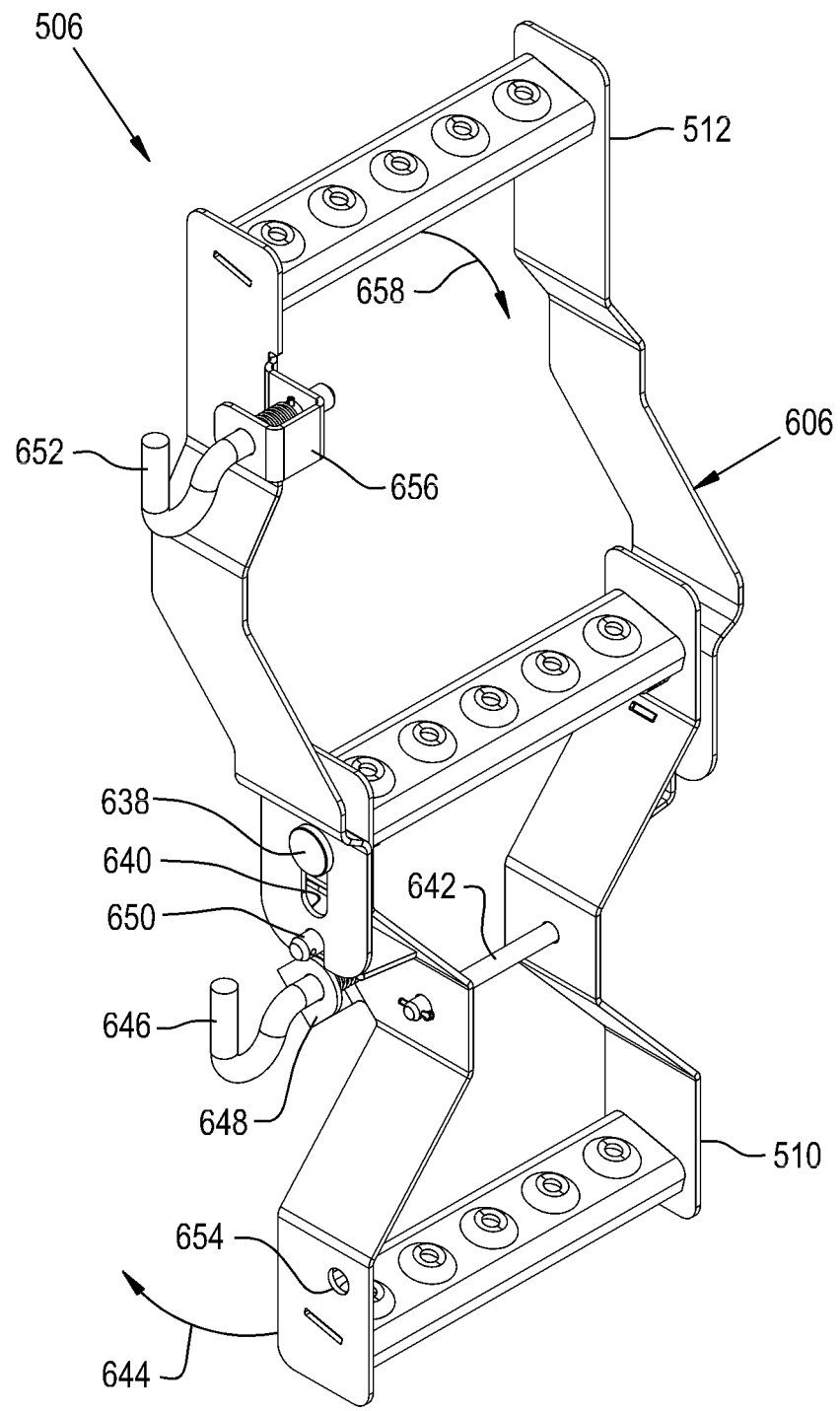
FIG. 7 is a perspective view of yet another embodiment of the step assembly according to the present invention.

FIG. 7 shows yet another embodiment of the step assembly of the present invention. The step assembly 506 of FIG. 7 generally corresponds to step assemblies 106 and 306, the corresponding parts being raised by 400 relative to step assembly 106 and 200 relative to step assembly 306. Although not shown, step assembly 506 can be attached to the support member shown in, and discussed above with reference to, FIG. 6. FIG. 7 shows the ladder 606 in the step operating position 520. The support member storage and operating positions for this embodiment are substantially similar to what is shown in FIG. 6. The step storage position is not specifically shown in FIG. 7 but can be understood from the description below.

Ladder 606 includes steps 510 and 512, step 510 being a ladder sub-assembly including two steps (and thus can be called a two-step weldment), step 512 being another ladder sub-assembly which includes a single step. Step 510 is similar to ladder 406 of FIG. 6, except that step 512 has been added to step 510 in FIG. 7. A clevis pin 642, along with a cotter pin through the distal end of clevis pin 642, holds step 510 onto the distal end of support arm, similar to what is shown in FIG. 6. FIG. 7 shows that step 512 includes side brackets which mount to the side of the side brackets of step 510. The attachment of step 512 to step 510 can be accomplished in the same way on each side of ladder 606. That is (for one such side), a clevis pin 638 inserts from the exterior into slot 640 of step 512 and through a corresponding hole in the side bracket of step 510. A plurality of washers (for example, four such washers) can be mounted on the free end of clevis pin 638 (to the inside of the side bracket), and then a cotter pin inserted through a through-hole in the free end of clevis pin 638 can be used to secure the washers onto clevis pin 638 (on the inside of the side bracket of step 510).

Step 510 can be secured in a step 510 storage position (which corresponds to step operating position 520). Step 510 occupies the step storage position when step 510 is rotated about pin 642 clockwise (as shown with arrow 644) in FIG. 7 so that step 510 is positioned adjacent the underside of the support arm and is thus substantially parallel to support arm 534 (step 510 then occupies a substantially horizontal position). Step 510 can be secured against the support arm in step 510 storage position by way of a ladder support pin 646 held to bracket 648, bracket 648 being mounted to the side of step 510. Ladder support pin 646 functions similar to ladder support pin 414 and thus can be selectively secured in a hole on the support arm corresponding to the step 510 storage position or in another hole on the support arm corresponding to the step 510 operating position. Similar to the spring-loaded operation of ladder support pin 214 (which is spring-loaded using spring 220, optionally washer 218, and pin 216), ladder support pin 646 also includes a spring, optionally a washer, and a pin through a through-hole in ladder support pin 646 (the spring, washer, and pin being situated within bracket 648 like those of ladder support pin 214 to bias ladder support pin 646 into a detent position. When step 510 is to be moved, ladder support pin 646 is pulled to release it from the detent hole and then released to secure within either detent hole.

Step 512 can be moved from the step 512 operating position shown in FIG. 7 to a step 512 storage position. The step 512 storage position is accomplished by rotating step 512 about clevis pin 638 clockwise in FIG. 7 (as shown with arrow 658) until step 512 rests substantially horizontally underneath step 510. Step 512 is then secured to step 510 in this horizontal position. However, before rotating step 512 clockwise, step 512 must be released from a detent position. FIG. 7 shows step 512 in a detent position relative to step 510. The side brackets of step 510 include outwardly projecting pins 650 which can be welded to the side brackets. The ends of the side brackets of step 512 near slots 640 include recesses. These recesses seat over pins 650 to lock step 512 in the step 512 operating position. To rotate step 512 in the clockwise direction, step 512 is first lifted off of pins 650 by sliding clevis pins 642 in their corresponding slots 640 and then rotating step 512. Further, step 512 can be secured to step 510 in the step 512 storage position by way of pin 652, which is associated with bracket 656. Pin 652 is formed similar to ladder support pin 646 and can thus similarly have a compression spring, a washer (optionally), and a pin biasing pin 652 like ladder support pin 646. Pin 652 can be secured to hole 654 when step 512 is in the step 512 storage position.

In use, step 510 can be rotated to the step 510 operating position. Step 512 can then be rotated to the step 512 operating position. This accomplishes the unfolding operation associated with steps 510 and 512. These steps can be done in reverse to return steps 510 and 512 to their respective storage positions. This accomplishes the folding operation associated with steps 510 and 512.

Figure 8:
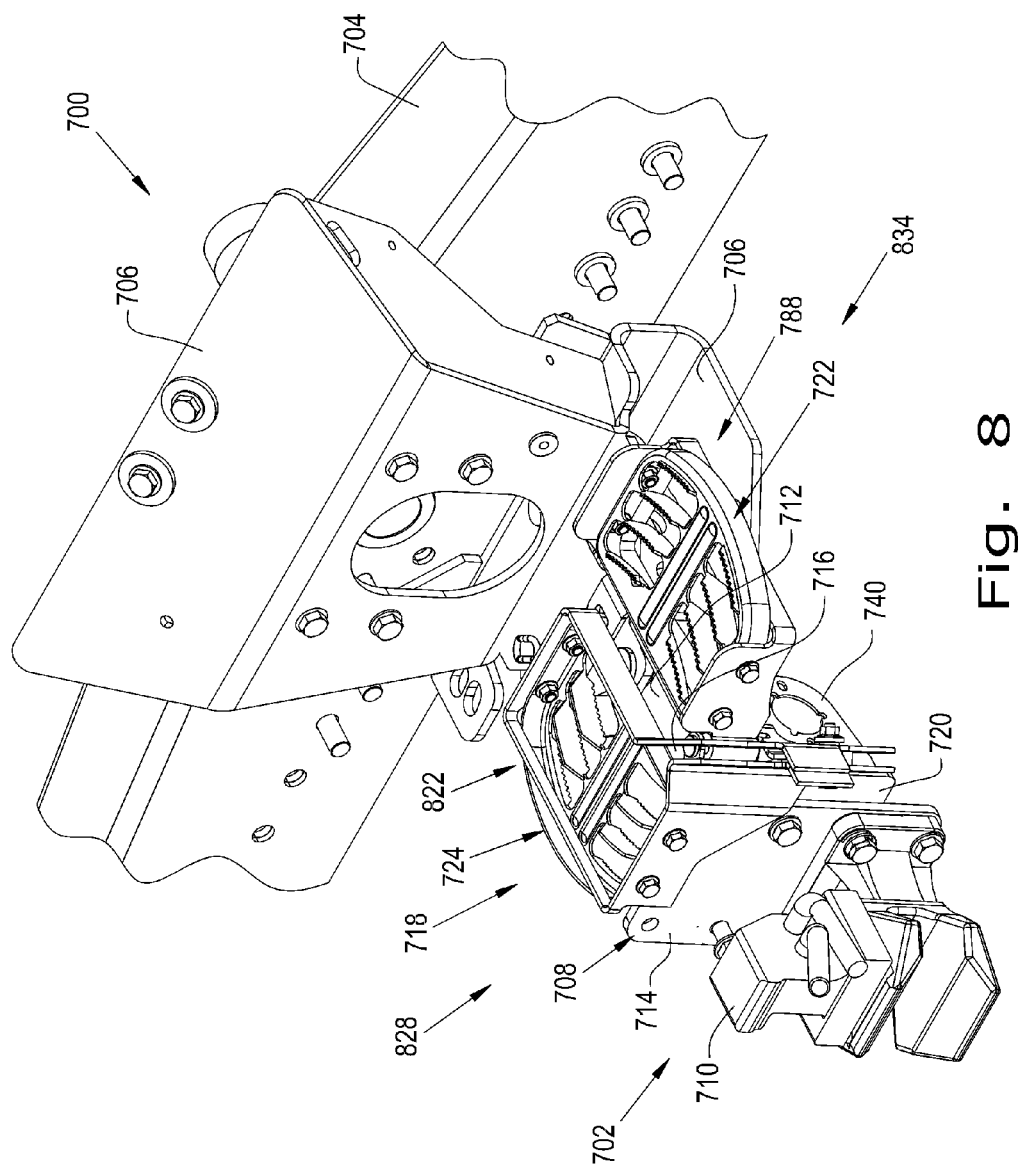
FIG. 8 is a perspective view of yet another embodiment of the step assembly according to the present invention.
Figure 9:
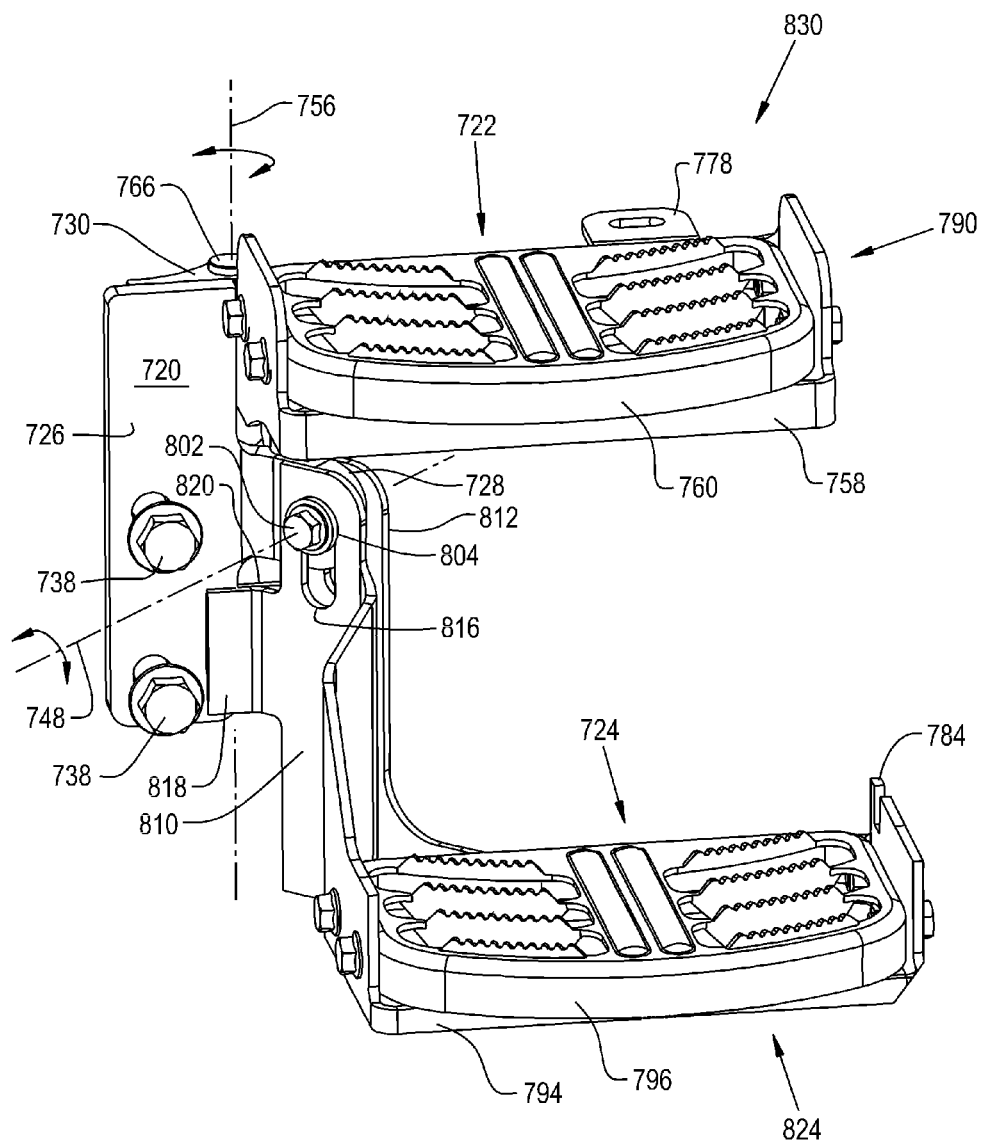
FIG. 9 is a perspective view of the step assembly of FIG. 8.
Figure 10:
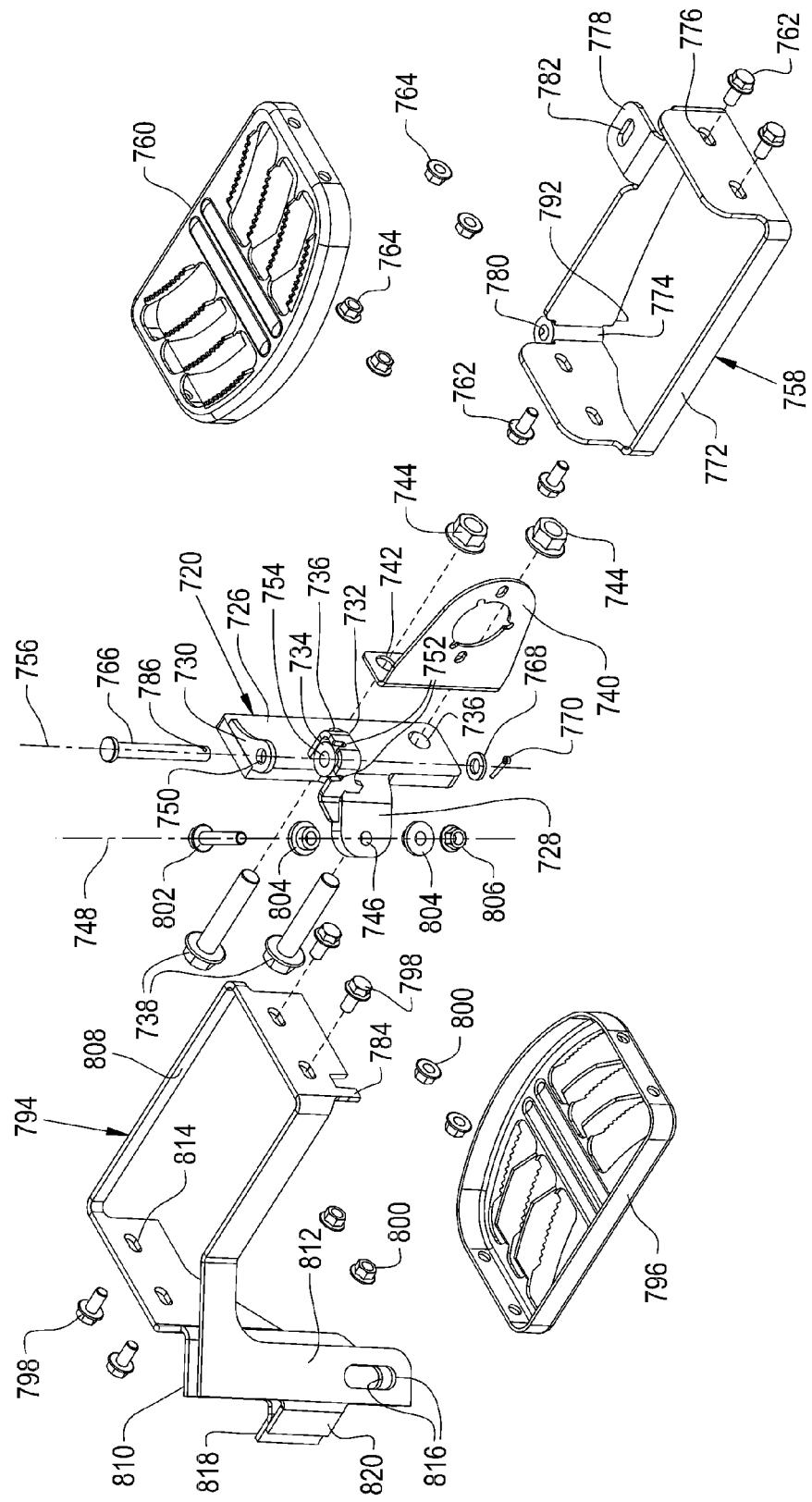
FIG. 10 is an exploded view of the step assembly of FIG. 8.

FIGS. 8-10 show yet another embodiment of the present invention. As in FIG. 2, FIGS. 8-10 show an agricultural machine 700, such as a combine, which includes a rear hitch assembly 702 which attaches to a combine chassis (not shown), the rear axle 704 also being attached to the combine chassis. Rear hitch assembly 702 is substantially similar to the rear hitch assembly 126. According to this embodiment, rear hitch assembly 702 includes hitch mount 706 (which attaches to the chassis), support member 708 attached (pivotally or nonpivotally) to hitch mount 706, and hitch 710. Support member 708 can optionally be fixedly attached to hitch mount 706. Support member 708 includes support arm 712 and a support plate 714, support plate 714 being on the distal end 716 of support arm 712 and thus adjacent hitch 710. A step assembly 718 can be attached to support plate 714 of support member 708; in this way, step assembly 718 can be added to rear hitch assembly 702 as an after-market product.

FIGS. 8-10 show that step assembly 718 includes a pivot plate 720 and a plurality of steps including a first step 722 and a second step 724. First step 722 can be considered a first step assembly 722, and second step 724 can be considered a second step assembly 724.

Pivot plate 720 (which can be referred to as a pivot weldment) includes a substantially flat wall 726, a first flange 728 angled relative to wall 726, a second flange 730, bushing holder 732, and a bushing 734. Flat wall 726 includes two through-holes 736. Two bolts 738 are inserted through two holes on support plate 714 and then through the two through-holes 736 of flat wall 726 which are aligned with the two holes of support plate 714. Mounting plate 740 (used for holding an electrical connector (not shown)) also has two through-holes 742 which align with holes 736 and the holes of support plate 714 and thus receive the bolts 738. Nuts 744 are used to secure the bolts 738 to support plate 714, flat wall 726, and mounting plate 740. In this way, pivot plate 720 is configured for being fixedly coupled with a hitch support arm 712. First flange 728 has a through-hole 746 which defines a horizontal axis 748.

Second flange 730 includes a through-hole 750 and can be welded to flat wall 726. Bushing holder 732 can be welded to flat wall 726 and/or first flange 728. Bushing holder 732 includes at least two recesses 752 on a top surface, these recesses 752 serving as detent mechanisms. Bushing holder 732 holds a bushing 734, which can be welded to bushing holder 732. Bushing 734 has a through-hole 754. Through-hole 750 of second flange 730 and through-hole 754 of bushing 734 vertically align with one another and together define a vertical axis 756 (which is perpendicular to horizontal axis 748).

First step assembly 722 includes a first frame 758, a first step tread 760, four bolts 762, four nuts 764, a clevis pin 766, a washer 768, and a pin 770. First frame 758 includes four walls 772, a bushing 774, four through-holes 776, and a flange 778. Bushing 774 has a through-hole 780 and is welded in a corner between two walls 772. Flange 778 is formed along one of the walls 772 and includes a slot 782 which can receive a projection 784. First step tread 760 is secured to first frame 758 by way of four bolts 762 and four nuts 764, the four bolts 762 being inserted through four corresponding holes 776 in first frame 758. Bushing 774 is positioned between second flange 730 and bushing 734 of pivot plate 720. Clevis pin 766 is inserted downwardly through hole 750 of second flange 730, hole 780 of bushing 774, and hole 754 of bushing 734. A washer 768 is secured to the distal end of clevis pin 766, and cotter pin 770 is inserted through a through-hole 786 at the end of clevis pin 766 to securely attach clevis pin 766. Bushing 774 is not as long as the gap between second flange 730 and bushing 734 and thus can slide along clevis pin 766, vertical axis 756 thus being defined by hole 750 of second flange 730, clevis pin 766, and hole 754 of bushing 734. First step 722 is thus connected to pivot plate 720 and is configured for pivoting relative to pivot plate 720 about vertical axis 756 between a first step storage position 788 and a first step operating position 790. First step storage position 788 is shown in FIG. 8, and first step operating position 790 is shown in FIG. 9. A bottom edge 792 of the rear wall 772 of first frame 758 can be selectively positioned in either of recesses 752. When bottom edge 792 is in first recess 752 (shown facing generally to the right in FIG. 10), then first step 722 is in the first step storage position 788. When bottom edge 792 is in second recess 752 (shown facing generally to the left in FIG. 10), then first step 722 is in the first step operating position 790. First frame 758 can be lifted out of either recess 752 and placed in the other recess 752 upon pivoting first frame 758 about clevis pin 766. In this way, bushing 774 of first step 722 is slidable along clevis pin 766 and thus along vertical axis 756 and pivotable about clevis pin 766 and thus about vertical axis 756. First step 722 can be returned to first step storage position 788.

Second step assembly 724 includes a second frame 794, a second step tread 796, four bolts 798, four nuts 800, an additional bolt 802, two stepped spacers 804 (which can be plated bushings with shoulders), and an additional nut 806. Second frame 794 includes a step section 808 and two substantially parallel flanges 810, 812. Step section 808 includes four holes 814. Step section 808 also includes projection 784. Each flange 810, 812 includes a slot 816, these slots 816 corresponding to one another. Flange 810 includes a tang 818, and flange 812 includes a tang 820. Tangs 818, 820 are offset to one another, tang 818 extending farther in one direction than tang 820, the end of tang 820 being welded to a side of tang 818. Second step tread 796 is secured to second frame 794 by way of four bolts 798 and four nuts 800, the four bolts 798 being inserted through four corresponding holes 814 in second frame 794. Second step assembly 724 is attached to first flange 728 of pivot plate 720 by way of bolt 802, spacers 804, and nut 806 using through-hole 746 of first flange 728. Spacers 804 are aligned with through-hole 746 of first flange 728 and placed on either side of first flange 728 between flanges 810, 812 of second frame 794. Bolt 802 is passed through flange 812, spacer 804, flange 728, spacer 804, and flange 810, and nut 806 is secured to bolt 802. Second step 724 is thus connected to pivot plate 720 and is configured for pivoting relative to pivot plate 720 about horizontal axis 748 between a second step storage position 822 and a second step operating position 824. Second step storage position 822 is shown in FIG. 8, and second step operating position 824 is shown in FIG. 9. When second step 724 is in second step storage position 822, projection 784 is inserted into hole 782 of flange 778. To remove projection 784 from hole 782, second step frame 794 can be lifted so as to lift projection 784 out of hole 782. Second step frame 794 can be so lifted because second step 724 is slidable in a direction that is perpendicular to horizontal axis by way of slot 816. Second step 724 can then be pivoted along horizontal axis 748 until second step 724 occupies second step operating position 824. Tang 818 can abut the face of flat wall 726, as shown in FIG. 9, to prevent second step 724 from rotating any further. Further, the distal end of tang 820 (along the thickness of the distal end) abuts the thickness of flat wall 726; the thickness of tang 820 is not as thick as flat wall 726. Second step 724 can be returned to second step storage position 822.

The plurality of steps 722, 724 are in a step storage position 828 when first step 722 is in the first step storage position 788 and second step 724 is in second step storage position 822, as shown in FIG. 8. The plurality of steps 722, 724 are in a step operating position 830 when first step 722 is in first step operating position 790 and second step 724 is in second step operating position 824, as shown in FIG. 9. The plurality of steps 722, 274 can include more than two steps. Second step 724 is positioned above first step 722 when the plurality of steps 722, 724 are in step storage position 828, and second step 724 is positioned below first step 722 when plurality of steps 722, 724 are in step operating position 830. Second step 724 is positioned upside down relative to first step 722 when plurality of steps 722, 724 are in step storage position 828. When steps 722, 724 are in step operating position 830, second step tread 796 is offset laterally relative to first step tread 760 in a direction further away from pivot plate 720 and is offset rearwardly (generally toward the viewer of the page of FIG. 9) relative to first step tread 760.

In use, after attaching first and second steps 722, 724 to pivot plate 720 and attaching pivot plate 720 to support plate 714, projection 784 of second step 724 can be lifted out of hole 782 and then second step 724 can be pivoted into second step operating position 824. First step 722 can then be pivoted into first step operating position 790 by lifting first frame 758 out of first recess 752, pivoting first frame 758 along clevis pin 766, and then inserting first frame 758 in second recess 752. First and second steps 722, 724 can then be returned to storage positions 788, 822 by proceeding in reverse order. In this way, first and second steps 722, 724 move between step storage position 828 and step operating position 830 when first and second steps 722, 724 are folded or unfolded relative to one another, the folding position being shown in FIG. 8, the unfolded position being shown in FIG. 9. Thus, considering FIG. 9, first step 722 is pivoted about vertical axis 756 (as indicated by the corresponding double-arrow), and second step 724 is pivoted about horizontal axis 748 (as indicated by the corresponding double-arrow). To move from the corresponding storage positions to the corresponding operating positions, step 724 can be rotated first and then step 722 can then be rotated into position. To return to the storage positions, step 722 can be rotated back first, and then step 724 can be rotated.

In this way, the present invention provides a method for using a step assembly for an agricultural machine, including the steps of: providing pivot plate 720 (as described above) and a plurality of steps including first step 722 and second step 724 (as described above) each connected to pivot plate; pivoting first step 722 relative to pivot plate 720 about first axis 756 between first step storage position 788 and first step operating position 790; pivoting second step 724 relative to pivot plate 720 about second axis 748 between second step storage position 822 and second step operating position 824, steps 722, 724 being in step storage position 828 when first step 722 is in first step storage position 788 and second step 724 is in second step storage position 822, steps 722, 724 being in step operating position 830 when first step 722 is in first step operating position 790 and second step 724 is in second step operating position 824. Further, the method can include sliding first step along first axis 756 and sliding second step 724 in a direction that is perpendicular to second axis 748. Further, the method can include fixedly coupling pivot plate 720 with hitch support arm 712.

According to an alternative understanding of the present invention, rear hitch assembly 702 can be understood to include the step assembly 718, and step assembly 718 can be understood to include support member 708 (which includes support arm 712 and support plate 714) and at least one step (which can include first step 722 and second step 724). According to this understanding, hitch mount 706 of rear hitch assembly 702 serves as the base member with which step assembly 718 is coupled. Rear hitch assembly 702 (while not so labeled) is substantially shown in FIGS. 2-4, less step assembly 718.

Support member 708 is coupled with hitch mount 706 and is configured for moving relative to hitch mount 706 between a support member storage position (this position is best shown in FIG. 3 where the hitch assembly has been rotated to be substantially parallel to rear axle 102) and a support member operating position 834 (as indicated by FIG. 8). First and second steps 722, 724 are coupled with the distal end 716 of support arm 712. First and second steps 722, 724 are coupled with support member 708 and are configured for moving relative to support member 708 between step assembly storage position 828 and step assembly operating position 830. Step assembly 718 is in step assembly storage position 828 when support member 708 is in support member storage position (shown in FIG. 3) and first and second steps 722, 724 are in step assembly storage position 828. Step assembly 718 is in a step assembly operating position 830 when support member 708 is in support member operating position 834 and first and second steps 722, 724 are in step assembly operating position 830.

In use, support member 708 can be pivoted (about a pivot pin, which is labeled 131 in FIG. 3, connecting support member 708 to hitch mount 706) from support member storage position (shown in FIG. 3) to support member operating position 834. Then, first and second steps 722, 724 can be unfolded relative to each other as described above so that steps 722, 724 are in step assembly operating position 830. Later, step assembly 718 can be folded back to a step assembly storage position 828, and then support member 708 can be pivoted back to support member storage position (shown in FIG. 3).

In this way, the present invention provides a method for using an agricultural machine, including the steps of: providing base member 706 (as described above) and step assembly 718 (as described above); moving support member 708 relative to base member 706 between support member storage position (shown in FIG. 3) and support member operating position 834; moving at least one step 722, 724 relative to support member 708 between step storage position 788, 822 and step operating position 790, 824, step assembly 718 being in step assembly storage position 828 when support member 708 is in support member storage position (shown in FIG. 3) and at least one step 722, 724 is in step storage position 788, 822, step assembly 718 being in step assembly operating position 830 when support member 708 is in support member operating position 834 and at least one step 722, 724 is in step operating position 790, 824. Steps 722, 724 can move between step storage position 788, 822 and step operating position 790, 824 when steps 722, 724 are folded or unfolded relative to one another.

In summary, the present invention provides a step assembly which may attach to a combine using some of the bolts which are used to hold the rear hitch to the combine chassis. The hitch bolts to the chassis using weld nuts, so this mounting location (either directly to the chassis or to the hitch mount which mounts to the chassis) is available to mount the step assembly whether or not the hitch is present. On the other hand, instead of a discrete assembly mounted to the same location on the chassis as the hitch, another embodiment of the present invention (FIGS. 8-10) provides that a rotating step assembly is mounted to the hitch (for example, hitch plate 714) so that the step assembly takes up minimal space when the hitch is needed but unfolds/rotates into an operating position. The step, as discussed above, has at least one step affixed to a step support which can rotate to the side and stow against the axle so as not to be in the way of the spreader system. Additionally, the step may rotate upon the step support to further reduce the space taken while in the storage position. The step assembly can be held in the storage position with a detent. The operator can grasp the step and release the detent to allow the step support to rotate to the operating position. Then, depending upon the specific design, one or more steps can rotate into an operating position from the storage position on the step support. The steps may be held in the operating and storage position with another detent. As indicated above, the step can be attached directly to the rear axle instead of to the chassis or the hitch mount. Alternatively, several chassis mounting locations can be used. Further, the rear hitch assembly and the step assembly of the present invention can be made of mild steel, although other materials can be used. The parts of the rear hitch assembly, as well as the parts of the step assembly, of the present invention can be welded to one another, if not shown as being connected another way.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural machine, comprising:
   a base member; and
   a step assembly coupled with said base member, said step assembly including:
      a support member coupled with said base member and configured for moving relative to said base member between a support member storage position and a support member operating position; and at least one step coupled with said support member by an arm that is pivotally mounted to the support member and configured for moving relative to said support member between a step storage position and a step operating position, said step assembly being in a step assembly storage position when said support member is in said support member storage position and said at least one step is in said step storage position, said step assembly being in a step assembly operating position when said support member is in said support member operating position and said at least one step is in said step operating position;

wherein the at least one step is mounted to the arm at a step connection point and said at least one step moves between said step storage position and said step operating position when said at least one step is rotated relative to said support member, said support member being configured for pivoting about a first axis between said support member storage position and said support member operating position, said arm being configured for pivoting about a second axis between said step storage position and said step operating position, said first axis and said second axis being one of perpendicular and at an acute angle relative to one another such that the vertical and horizontal distances between the at least one step connection point and the support member is changed as the at least one step moves between the support member operating position and the step operating position, wherein said at least one step includes a plurality of steps and at least one of the plurality of steps is located above the pivotal connection of the arm to the support member and at least one of the plurality of steps is located below the pivotal connection of the arm to the support member when in said step operating position and said support member includes an elongate support arm including a distal end, said arm and at least one step are coupled with said distal end.

2. The agricultural machine of claim 1, wherein the agricultural machine is an agricultural harvester and the base member is a portion of the agricultural harvester.

3. The agricultural machine of claim 1, wherein said base member is a mounting member for a rear hitch assembly.

4. The agricultural machine of claim 1, wherein the agricultural machine further comprises a rear axle and the at least one step and support member are located generally adjacent the rear axle when in the support member storage position.

5. The agricultural machine of claim 1, wherein said plurality of steps move between said step storage position and said step operating position when said plurality of steps are one of folded and unfolded relative to one another.

6. A step assembly for being coupled with a base member of an agricultural machine, said step assembly comprising:

a support member configured for being coupled with the base member and for moving relative to the base member between a support member storage position and a support member operating position; and at least one step coupled with said support member and configured for moving relative to said support member between a step storage position and a step operating position, said step assembly being in a step assembly storage position when said support member is in said support member storage position and said at least one step is in said step storage position, said step assembly being in a step assembly operating position when said support member is in said support member operating position and said at least one step is in said step operating position wherein the at least one step is coupled to a mounting arm pivotally connected to the support member, wherein said at least one step moves between said step storage position and said step operating position when said at least one steps is rotated relative to said support member, said arm being configured for pivoting about a skewed axis such that the vertical and horizontal distances between the connection point of the at least one step and the arm connection point and the support member is changed as the at least one step moves between the support member operating position and the step operating position, wherein said at least one step includes a plurality of steps and at least one of the plurality of steps is located above the pivotal connection of the arm to the support member and at least one of the plurality of steps is located below the pivotal connection of the arm to the support member when in said step operating position and wherein said support member includes an elongate support arm including a distal end, said at least one step being pivotally coupled with said distal end by the mounting arm, the mounting arm having first and second ends, and the at least one step comprises a first step mounted to the first end and a second step coupled to the second end.

7. The step assembly of claim 6, wherein the mounting arm is pivotally connected to the support arm between said first and second end and an additional step is mounted to the support arm.

8. The step assembly of claim 7, wherein said support member is configured for pivoting about a first axis between said support member storage position and said support member operating position, said plurality of steps being configured for pivoting about the offset axis between said step storage position and said step operating position, said first axis and said second axis being one of perpendicular and at an acute angle relative to one another.

9. The step assembly of claim 7, wherein said plurality of steps move between said step storage position and said step operating position when said plurality of steps are one of folded and unfolded relative to one another.

* * * * *